Jan. 13, 1953     S. ALLEN ET AL     2,625,011
IGNITER FOR LIQUID FUEL COMBUSTION CHAMBERS
Filed May 18, 1949     2 SHEETS—SHEET 1

Inventors
SIDNEY ALLEN &
By M.A. STOKES
Attorneys

Patented Jan. 13, 1953

2,625,011

UNITED STATES PATENT OFFICE 2,625,011

IGNITER FOR LIQUID FUEL COMBUSTION CHAMBERS

Sidney Allen and Morris Amos Stokes, Coventry, England, assignors to Armstrong Siddeley Motors Limited, Coventry, England Application May 18, 1949, Serial No. 93,954
In Great Britain July 31, 1948

5 Claims. (Cl. 60—39.14)

This invention relates to a combustion system of a gas turbine engine.

Such a combustion system may be in the form (hereinafter sometimes referred to as "the first form") of a circle of elongated combustion chamber units each including a flame chamber, in which combustion is substantially completed, surrounded by an annular passage containing cooling diluent air. The flame chamber may be of the spray type or of the pre-heated vaporising type.

Alternatively, the combustion system may be in the form (hereinafter sometimes referred to as "the second form") of a substantially uniform annular combustion chamber unit having a substantially uniform annular flame chamber heat-insulated at its inner and outer peripheries by annular passages containing cooling diluent air.

The main object of the invention is to initiate combustion in a very simple and satisfactory manner—and, particularly, to ensure effective ignition in all conditions of air flow through the plant.

Patent No. 2,540,642 granted February 6, 1951, discloses an arrangement, as applied to "the first form," in which at least one of the flame chambers is provided with a fuel spray device associated with a sparking plug (for example, combined therewith to form a "torch igniter"), whilst each of the chambers having no "torch igniter" is provided with a relatively-high pressure auxiliary fuel spray device disposed so that the auxiliary fuel spray in a chamber will be ignited by the burning mixture passing through one of the lateral passages (with which all the flame chambers are interconnected) from an adjacent chamber in which ignition has already been affected. Whilst such an arrangement works in an extremely satisfactory manner in ordinary starting conditions, difficulty is sometimes encountered at other times when very high air speeds are present—as when an aircraft powered by the engine is diving.

The invention broadly consists in a combustion chamber unit, of the kind including a flame chamber, in which combustion is substantially completed, surrounded by an annular passage containing cooling diluent air, having, in advance of the flame chamber, a shielded region in which the air is comparatively static and with which communicates, for starting purposes, an auxiliary fuel spray device which is independent of the main fuel supply means for the flame chamber.

In the case of a combustion system of "the first form," at least one of the units, according to a further feature of the invention, has a sparking plug associated with the auxiliary fuel spray device (for example, to form a "torch igniter") in the shielded region of the unit, and also characterised in that the shielded regions of adjacent units are interconnected with one another by lateral passages.

One advantage of such an arrangement is that the provision of lateral passages interconnecting the actual flame chambers is no longer essential.

In the case of a combustion system of "the second form" there is, according to a further feature of the invention, a plurality of angularly spaced auxiliary fuel spray devices communicating with the shielded region, which is also annular, and at least one of the auxiliary fuel spray devices is associated with a sparking plug.

As soon as ignition has been initiated the supply to the auxiliary fuel spray devices should be discontinued in order to prevent burning out the portion of the combustion chamber unit which is in advance of the flame tube, and for this purpose a time switch, a centrifugal switch or a heat-responsive switch may conveniently be used.

The supply of fuel to the auxiliary spray devices may be arranged as disclosed in the patent aforesaid.

Figure 2:
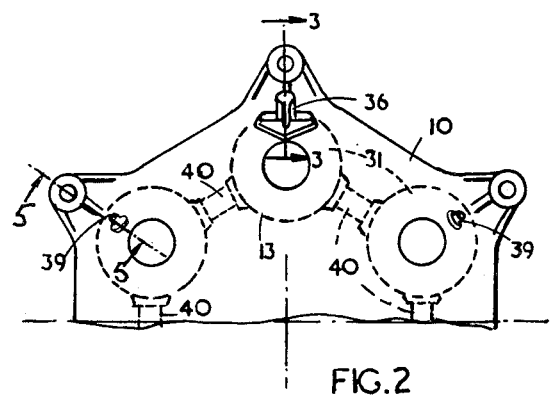
Figure 2 is a fragmentary elevation, mainly in outline, of the annular manifold for the combustion chamber units, the view being along the line 2—2 of Figure 1.
Figure 1:
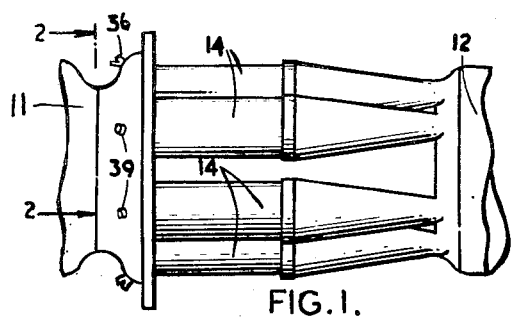
Figure 1 is a fragmentary elevation of a gas turbine engine having a combustion chamber system of "the first form," incorporating six combustion chamber units, arranged according to the invention.
Figure 3:
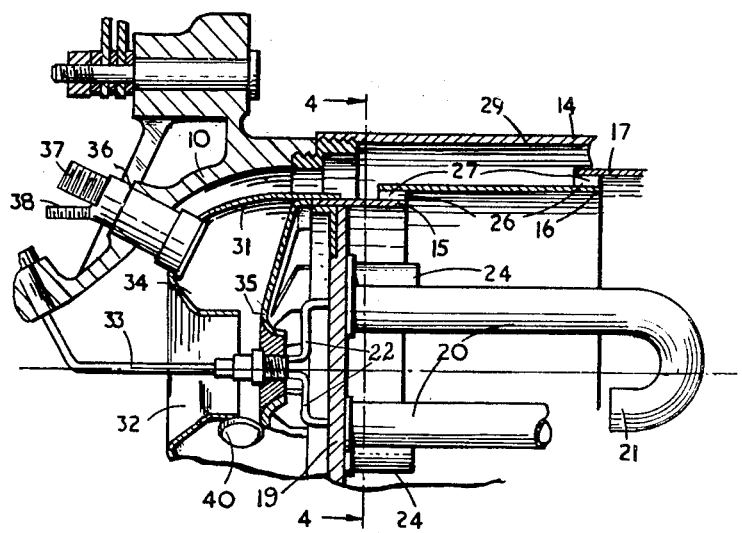
Figure 3 is a fragmentary sectional view, and to a larger scale, through one form of flame chamber having the present invention incorporated therewith, the section being generally along the line 3—3 of Figure 2.
Figure 4:
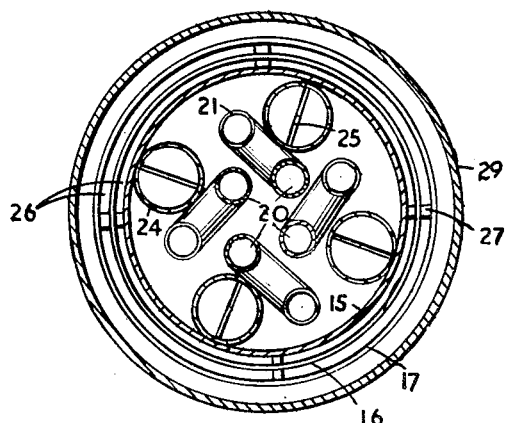
Figure 4 is a cross-section on the line 4—4 of Figure 3.

Figures 1 and 2 show the outline of an annular manifold 10 which constitutes the outlet of the compressor, part of which is shown at 11. The combustion chamber system shown is one incorporating six elongated combustion chamber units 14 arranged in a circle round the axis of the plant, each of these chambers being in general identical with one another and as shown by Figures 3 and 4. That is to say, each includes an external casing 14 of circular section and an inner casing, also of circular section, forming the flame chamber. The inner casing is built up of a plurality of radially spaced axially overlapping rings of which only three 15, 16 and 17, are shown in Figures 3 and 4 by way of example. The combustion chamber units supply the turbine, part of which is indicated at 12.

The inlet end of each flame chamber is closed by a baffle 19 having a circle of four openings in it to receive the inlet ends 20 of J-pipes the outlet ends 21 of which are directed forwardly towards the baffle. The air passing from the compressor 11 to the turbine 12 of the engine travels from left to right in Figure 3, and primary air for combustion purposes enters the inlet ends 20 of the J-like pipes and is there mixed with fuel delivered along the pipes 22, 22 in the manner shown in the patent aforesaid, i. e., at a relatively low pressure rising up to about ten pounds per square inch.

In the baffle is another circle of holes in which are fitted cylindrical cup-like members 24, 24 each having a slit 25 to provide a nozzle for secondary air to mix with the mixture of fuel and primary air issuing from the outlet ends 21 of the J-like pipes and enable combustion to be completed within the flame chamber. Additional air passes through the two annular spaces 26, 26, defined by the rings 15 and 16, and 16 and 17, respectively, between the spacers 27, 27 and this additional air serves also for cooling and protecting the rings 16, 17 from the burning gases within the flame chamber.

Diluent cooling air passes along the annular passage 29 round the flame chamber to mingle with the products of combustion issuing from the outlet end (not shown in Figure 3) of the flame chamber.

Figure 5:
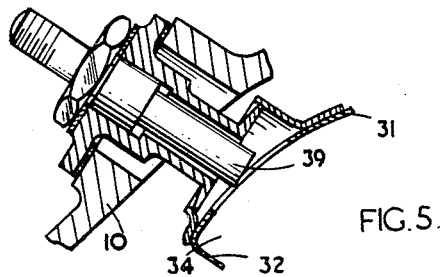
Figure 5 is a fragmentary view to a still larger scale, taken on the line 5—5 of Figure 2.

In the present instance a casing 31 (Figures 3 and 5) is provided for each flame chamber to extend forwardly from the inlet end thereof within the interior of the manifold 19, and the forward end of each casing 31 is provided with a re-entrant flange 32 through which the primary air, and secondary air for the slits 25, passes as well as the main fuel supply pipe 33 to which the individual pipes 22 are connected. Thus, within the interior of this casing 31 is left an annular space 34 round the re-entrant flange 32 in which the air is relatively static in all conditions, and bounding this space is a spider 35 supporting at its centre the pipes 22 and 33. It is with this region that the "torch igniter" 36 (comprising a sparking plug, part of which is shown at 37, and an auxiliary fuel spray device, part of which is shown at 38) is associated in Figure 3, and the auxiliary fuel spray device 39 in Figure 5. It is also with this region that the lateral passages 40, 40 communicate, these passages interconnecting each combustion unit with the two adjacent units.

In starting up, as soon as ignition is effected by the "torch igniter," most of the burning mixture in the annular space 34 passes through the spider 35 and then through the secondary air slits 25 into the flame chamber, there to ignite the mixture issuing from the outlet ends 21 of the J-like pipes and to heat these pipes to promote vaporization of the fuel particles in the mixture passing therethrough. A small proportion of the ignited mixture in the annular space will probably enter the inlet ends of the J-like pipes, but the mixture of fuel and primary air therein is too rich for pre-ignition to be likely to occur in the J-like pipes. At the same time, some of the ignited mixture in the annular space 34 passes through a lateral passage 40 to the auxiliary fuel spray in the annular space 34 of an adjacent unit and ignites the fuel spray in that annular space. And so on.

In practice, two opposite units preferably have torch igniters 36, these being duplicated in case one of them should inadvertently fail, the remaining units, four in the example shown, having merely the auxiliary fuel spray devices 39.

What we claim as our invention and desire to secure by Letters Patent of the United States is:

1. For a gas turbine engine including a compressor and a turbine, a combustion chamber unit through which air from the compressor passes to the turbine, said unit including a flame chamber, a main spray device for supplying fuel to the flame chamber, the latter being arranged so that the combustion of air passing through the flame chamber and the fuel from said main spray device is substantially completed, means outside and upstream of said flame chamber providing a shielded region in which the air is comparatively stagnant, and, for starting purposes, an auxiliary fuel spray device communicating with said shielded region, means connecting the shielded region with the flame chamber, said means being disposed in the path of entry into the flame chamber of secondary air so that most of the burning mixture from the auxiliary spray device passes into the flame chamber admixed with secondary air.

2. For a gas turbine engine including a compressor and a turbine, a combustion system including a plurality of elongated combustion chamber units, each including a flame chamber in which the combustion of air passing through the flame chamber and added fuel is substantially completed, means in advance of said flame chamber providing a shielded area in which the air is comparatively stagment, and, for starting purposes, an auxiliary fuel spray device communicating with said shielded region, the said units being arranged in a circle about the axis of the engine, at least one of said units having a sparking plug associated with the auxiliary fuel spray device in said shielded region, and passage means interconnecting said shielded regions of adjacent units.

3. For a gas turbine engine including a compressor and a turbine, a combustion chamber unit through which air from the compressor passes to the turbine, said unit including an elongated casing, a flame chamber within and spaced from said casing, means for supplying fuel to said flame chamber, said flame chamber having a forwardly extending casing, means providing said latter casing with a re-entrant flange which, at its radially outer side, defines the inner wall of an annular space, and which, at its radially inner side, forms a passage through which passes combustion air for said flame chamber, and a fuel spray device communicating with the annular space round said re-entrant flange.

4. A combustion system including a plurality of combustion chamber units, means for supplying compressed air through said units in parallel, each of said units including a casing, a flame chamber within and spaced from said casing, and means for supplying fuel to said flame chamber, each of said flame chambers having a casing extending forwardly from its inlet end and carrying a re-entrant flange which, at its radially outer side, defines the inner wall of an annular space, and which, at its radially inner side, forms a passage through which passes combustion air for the fuel supplied to the flame chamber, auxiliary fuel spray devices respectively associated with the annular spaces round the re-entrant flanges of the units, a sparking plug associated with one of said auxiliary fuel spray devices, and passage means interconnecting the said annular spaces of adjacent units.

5. A gas turbine engine including an axial-flow compressor, a combustion system and a turbine, said compressor having an outlet manifold, said combustion system including a plurality of elongated combustion chamber units having their inlet ends connected to said manifold and their outlet ends connected to said turbine, each of said units having a flame chamber therein in which the combustion of added fuel and some of the air passing through the unit is substantially completed, each of said flame chambers having a casing extending forwardly into the interior of said manifold, each of said last-mentioned casings carrying a re-entrant flange through which passes the combustion air for the associated flame chamber and round which is a region in which the air is comparatively static, fuel spray devices carried by said manifold and communicating respectively with said regions, a sparking plug carried by said manifold and associated with one of said fuel spray devices, and passage means within said manifold interconnecting said regions.

SIDNEY ALLEN.
MORRIS AMOS STOKES.

REFERENCES CITED

The following references are of record in the file of this patent:

UNITED STATES PATENTS

| Number | Name | Date |
|---|---|---|
| 2,404,335 | Whittle | July 16, 1946 |
| 2,493,641 | Putz | Jan. 3, 1950 |